(12) United States Patent
Baettig et al.

(10) Patent No.: US 10,259,942 B2
(45) Date of Patent: Apr. 16, 2019

(54) BLACK TRISAZO DYES, THEIR PREPARATION AND THEIR USE

(71) Applicant: DFI CHEM GmbH, Marly (CH)

(72) Inventors: Kurt Baettig, Le Mouret (CH); Damien Moigno, Marly (CH)

(73) Assignee: DFI Chem GmbH, Marly (CH)

( * ) Notice: Subject to any disclaimer, the term of this patent is extended or adjusted under 35 U.S.C. 154(b) by 0 days.

(21) Appl. No.: 15/527,175

(22) PCT Filed: Nov. 11, 2015

(86) PCT No.: PCT/EP2015/076355
§ 371 (c)(1),
(2) Date: May 16, 2017

(87) PCT Pub. No.: WO2016/078988
PCT Pub. Date: May 26, 2016

(65) Prior Publication Data
US 2017/0335110 A1  Nov. 23, 2017

(30) Foreign Application Priority Data

Nov. 17, 2014 (EP) .................... 14020086

(51) Int. Cl.
| C09B 31/26 | (2006.01) |
| C09B 33/22 | (2006.01) |
| C09D 11/328 | (2014.01) |
| C09B 67/22 | (2006.01) |
| C09D 11/17 | (2014.01) |
| B41J 2/01 | (2006.01) |
| B41J 3/407 | (2006.01) |
| C09D 11/037 | (2014.01) |

(52) U.S. Cl.
CPC .............. C09B 31/26 (2013.01); B41J 2/01 (2013.01); B41J 3/4073 (2013.01); C09B 33/22 (2013.01); C09B 67/0046 (2013.01); C09D 11/037 (2013.01); C09D 11/17 (2013.01); C09D 11/328 (2013.01)

(58) Field of Classification Search
CPC ... C09B 3/26; C09B 33/22; B41J 2/01; C09D 11/17; C09D 11/328
USPC .............. 428/195.1; 8/687; 106/31.27, 31.52
See application file for complete search history.

(56) References Cited

U.S. PATENT DOCUMENTS

| 4,097,476 A | 6/1978 | Wicki |
| 5,423,906 A | 6/1995 | Gregory et al. |
| 2004/0158050 A1 | 8/2004 | Lee et al. |

FOREIGN PATENT DOCUMENTS

| EP | 1693422 | 8/2006 |
| GB | 2200918 | 8/1988 |
| WO | 2010/057830 | 5/2010 |

*Primary Examiner* — Bruce H Hess
(74) *Attorney, Agent, or Firm* — Servilla Whitney LLC

(57) ABSTRACT

The present invention provides trisazo dyes of formula (V), wherein A, M and $R_1$, $R_2$, $R_3$, $R_4$ are as defined in the specification, processes for their preparation, recording liquids and liquid dye preparations containing them and their use in inks as well as processes for applying them and printed articles comprising them.

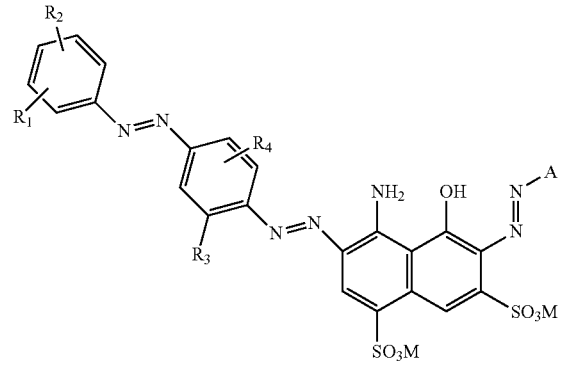

(V)

19 Claims, No Drawings

BLACK TRISAZO DYES, THEIR PREPARATION AND THEIR USE

FIELD OF THE INVENTION

The invention relates to novel trisazo black dyes and their salts, a method of their preparation and their use in dying and printing operations. It also relates to liquid dye preparations containing these trisazo dyes, in particular to aqueous recording fluids for ink jet printing and for writing utensils.

BACKGROUND OF THE INVENTION

The speed of modern ink jet printers has to increase steadily for economic reasons. Particularly suitable recording sheets for such printers comprise nanoporous inorganic compounds such as for example silicium dioxide, aluminum oxide/hydroxide, aluminum oxide or their mixtures. Such recording sheets are known as "nanoporous recording sheets". Images printed onto these recording sheets need to have a good storage stability even under adverse conditions. This can only be achieved by using a finely tuned system of inks, respectively the dyes contained therein.

Up to now, these images do not satisfy all required properties. In particular, the water fastness, the light stability, the ozone stability, the hue and the brilliance of images printed onto these recording sheets are not satisfactory. Thus, new dyes are looked for which would improve the properties mentioned above of images printed onto these recording sheets, in particular in areas with black hue.

In addition to this, industrial ink jet is getting more and more significant in the packaging and food packaging industry. In that segment waterfastness, lightfastness and the use of safe components is a must. It is also required that these properties are the same independently to the recording medium used.

Although quite a number black dyes have already been proposed as black dyes for ink jet printing. However, none satisfies all of the required properties.

In addition to this the dyes should present a good water solubility being human and ecologically safe.

The following black dyes are often used in industrial ink jet Printers:

C.I. Acid Black 1 with the Formula (I)

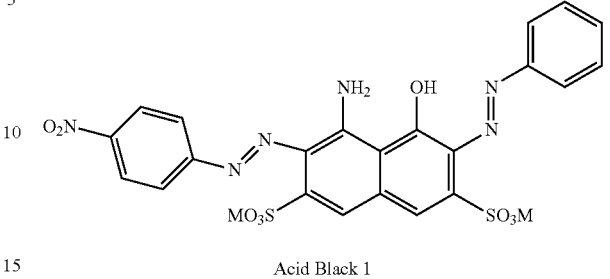

Acid Black 1

This dye is too bluish and present poor waterfastness when printed on standard plain paper.

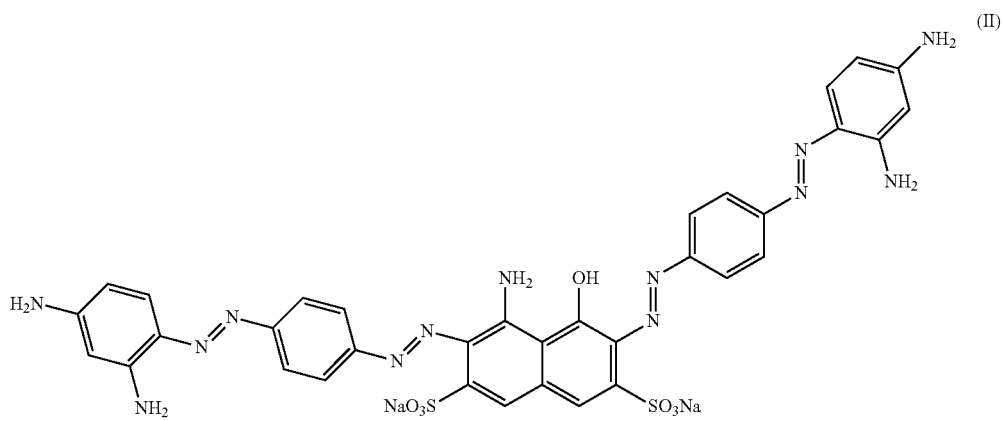

C.I. Direct Black 19

The direct black 19 that present a good waterfastness is usually available as a mixture containing different side products and is described to be tested mutagenic (U.S. Pat. No. 5,340,929).

Although quite a number black dyes have already been proposed as black dyes for ink jet printing as in the U.S. Pat. No. 5,423,906 and US 2012/0090503 A1. However, none satisfies all of the required properties.

Various types of ink compositions have been proposed. Typical inks comprise one or more dyes or pigments, water, organic co-solvents and other additives.

The inks have to satisfy the following criteria:

(1) The ink gives images of excellent quality on any type of recording sheet.
(2) The ink gives printed images exhibiting good water fastness.
(3) The ink gives printed images exhibiting good light stability.
(4) The ink gives printed images exhibiting good ozone fastness.
(5) The ink gives printed images exhibiting excellent smudge behavior.
(6) The ink gives printed images exhibiting excellent storage stability under conditions of high temperature and humidity.

(7) The ink does not clog jetting nozzles of the ink jet printers even when these are kept uncapped while recording is suspended for long periods.
(8) The ink may be stored for long periods without deterioration of its quality.
(9) The ink has to be non-toxic, non-flammable and safe.

SUMMARY OF THE INVENTION

An objective of the invention is the provision of novel black trisazo dyes with black, as far as possible neutral hue and their use in aqueous inks, in particular in recording fluids for ink jet printing and for writing utensils. They are particularly advantageous in ink jet printing for the preparation of images or colourings on rapidly drying nanoporous recording sheets. These novel black trisazo dyes with high colouring strength have an excellent solubility in aqueous formulations, they give images or colourings having good overall properties, in particular in ink jet printing, where they provide images with brilliant hue, where the sharpness of the images is not or only slightly deteriorated during long periods of storage under conditions of high temperature and humidity. The images also show good light stability and excellent ozone fastness and low bleeding.

A further objective of the invention is the provision of liquid dye preparations, in particular of inks for ink jet printing and for writing utensils, giving a spectrally unchanged hue on any type of recording sheet.

It is further object of the invention to provide a method of manufacturing dyes and/or dying compositions, such as inks, recording liquids, textile colorants and dyeing solutions for manufacturing colour filters for optical and/or opto-electronic applications, which all have at least some, preferably all of the aforementioned advantageous properties. Further, it is an object of the invention to provide a method of applying a dyeing composition, such as an ink, a recording liquid, or a textile colorant with at least one of the dyes to a substrate, preferably without using volatile organic solvents.

A further objective of the invention is the provision of inks having all the required properties mentioned before.

DESCRIPTION OF THE INVENTION

The present invention relates to novel trisazo dyes of general formula (V)

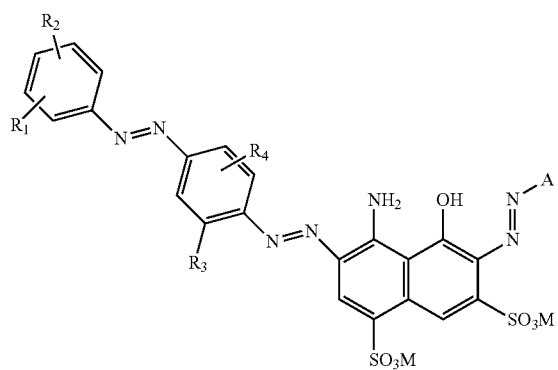

(V)

where
M represents a hydrogen atom, a metal cation or an ammonium cation, which optionally may be substituted by one or more alkyl or substituted alkyl groups each having from 1 to 18 C atoms;
where
$R_1$, $R_2$ independently represent a hydrogen atom, a $SO_3M$ group, a COOM group, a Halogen atom, a $NO_2$ group, an ester group, an alkyl- or alkoxy group each having from 1 to 6 carbon atoms, an unsubstituted or substituted amide or sulfonamide group each having up to 12 carbon atoms, wherein the substituents are selected from the group consisting of COOM, OH, $OCH_3$, $NH_2$, Cl, $COOCH_3$, $COOCH_2CH_3$, $CH_3$, $CH_2CH_2COOM$, $(CH_2)_3COOM$ and $CH_2OCH_2COOM$,
where
$R_3$, $R_4$ independently represent a hydrogen atom, an alkyl- or alkoxy group each having from 1 to 6 carbon atoms, an unsubstituted or substituted amide or sulfonamide or sulfonamide group each having up to 6 carbon atoms, wherein the substituents are selected from the group consisting of COOM, OH, $OCH_3$, $NH_2$, Cl, $COOCH_3$, $COOCH_2CH_3$, $CH_3$, $CH_2CH_2COOM$, $(CH_2)_3COOM$ and $CH_2OCH_2COOM$,
where
either A represents a moiety of general formula (VI)

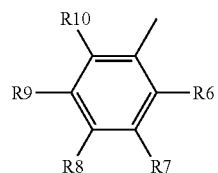

(VI)

where
$R_6$, $R_7$, $R_8$, $R_9$, $R_{10}$ independently represent a hydrogen atom, a $SO_3M$ group, a $NO_2$ group, an amino group, a COOM group, a Halogen atom, an ester group, an alkyl or alkoxy group each having from 1 to 2 carbon atoms, an unsubstituted or substituted amide or sulfonamide group each having up to 6 carbon atoms, wherein the substituents are selected from the group consisting of COOM, OH, $OCH_3$, $COOCH_3$, $COOCH_2CH_3$, $CH_3$, $CH_2CH_2COOM$, $(CH_2)_3COOM$ and $CH_2OCH_2COOM$;
or A represents a moiety of general formula (VII)

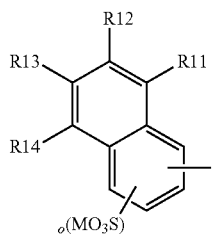

(VII)

wherein
o is 0 or 1
and
$R_{11}$, $R_{12}$, $R_{13}$, $R_{14}$ independently represent a hydrogen atom, a $SO_3M$ group, a $NO_2$ group, a COOM group, an unsubstituted or substituted amide or sulfonamide group having up to 6 carbon atom, wherein the substituents are selected from the group consisting of COOM, OH, OCH$_3$, NH$_2$, Cl, COOCH$_3$, COOCH$_2$CH$_3$, CH$_3$, CH$_2$CH$_2$COOM, (CH$_2$)$_3$COOM and CH$_2$OCH$_2$COOM.

Preferred are trisazo dyes of general formula (V), wherein M is as defined before, R$_1$, R$_2$ independently represent a hydrogen atom, a SO$_3$M group, or a COOM group, an unsubstituted or substituted amide or sulfonamide group having up to 6 carbon atom, wherein the substituents are selected from the group consisting of COOM, OH, OCH$_3$, NH$_2$, Cl, COOCH$_3$, COOCH$_2$CH$_3$, CH$_3$, CH$_2$CH$_2$COOM, (CH$_2$)$_3$COOM and CH$_2$OCH$_2$COOM;

R$_3$, R$_4$ independently represent a hydrogen atom, an alkyl or an alkoxy group each having 1 to 2 carbon atoms, an unsubstituted or substituted amide or sulfonamide group having up to 6 carbon atom, wherein the substituents are selected from the group consisting of COOM, OH, OCH$_3$, NH$_2$, Cl, COOCH$_3$, COOCH$_2$CH$_3$, CH$_3$, CH$_2$CH$_2$COOM, (CH$_2$)$_3$COOM and CH$_2$OCH$_2$COOM;

A represent a moiety of general formula (VI) as described before

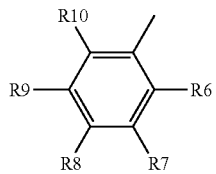

(VI)

where

R$_6$, R$_{10}$ independently represent a hydrogen atom, a SO$_3$M group, a NO$_2$ group, a COOM group (more preferably independently a hydrogen atom, a SO$_3$M group, a NO$_2$ group)
and R$_7$, R$_9$ independently represent a hydrogen atom, a COOM group (more preferably both represent a hydrogen atom)
and R$_8$, represents a hydrogen group, a SO$_3$M group, a NO2 group, an substituted amide or sulfonamide group having up to 6 carbon atoms, wherein the substituents are selected from the group consisting of COOM, OH, OCH$_3$, NH$_2$, Cl, COOCH$_3$, COOCH$_2$CH$_3$, CH$_3$, CH$_2$CH$_2$COOM, (CH$_2$)$_3$COOM and CH$_2$OCH$_2$COOM (more preferably a SO$_3$M group, a NO2 group, an substituted amide or sulfonamide group as described).

Even more particularly preferred are trisazo dyes of general formula (V), wherein M is as defined before, R$_1$, R$_2$ independently represent a hydrogen atom, or a COOM group;

R$_3$, R$_4$ independently represent a hydrogen atom, an alkyl or alkoxy group each having 1 to 2 carbon atoms;

A represent a moiety of general formula (VI) as described before

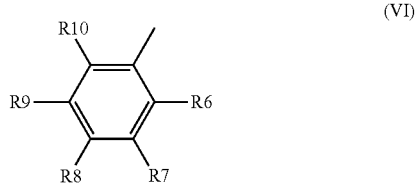

(VI)

where

R$_6$, R$_{10}$ independently represent a hydrogen atom, a SO$_3$M group, or a NO$_2$ group, R$_7$, R$_9$ represent a hydrogen atom,
and R$_8$, represents a SO$_3$M group, a NO$_2$ group a substituted amide or sulfonamide group having up to 6 carbon atoms, wherein the substituents are selected from the group consisting of CH$_3$, CH$_2$CH$_2$COOM, (CH$_2$)$_3$COOM and CH$_2$OCH$_2$COOM (most preferably R8 represents a NO$_2$ group, a NHCOCH$_3$ group, NHCOCH$_2$CH$_2$COOM group, NHCO(CH$_2$)$_3$COOM group or a NHCOCH$_2$OCH$_2$COOM group).

As metal cations, the cations of the alkali metals (Li, Na, K, Rb, Cs), of the alkaline earth metals (Mg, Ca, Sr, Ba) and the ammonium cation, optionally substituted by one or more alkyl groups having each from 1 to 4 carbon atoms or by hydroxy substituted alkyl each having from 1 to 6 carbon atoms are preferred.

Specific examples of trisazo dyes of general formula (IV) are the following, where the substituent M is defined in Table 1.

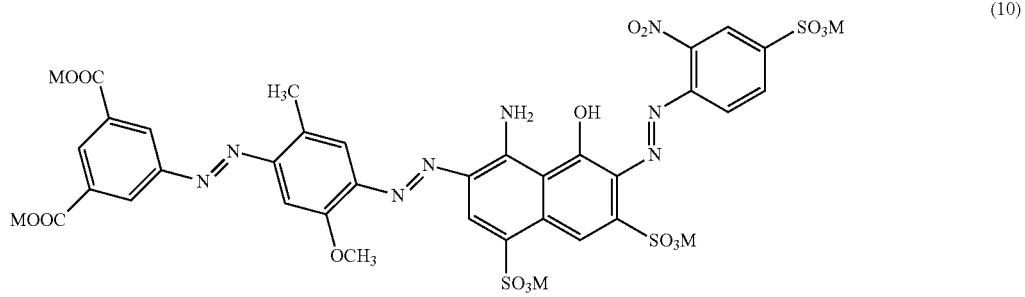

(10)

-continued
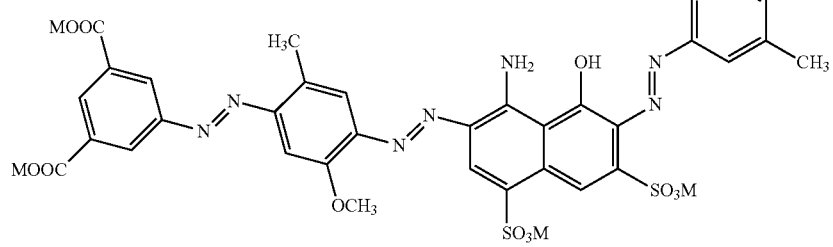
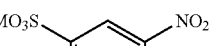
(11)
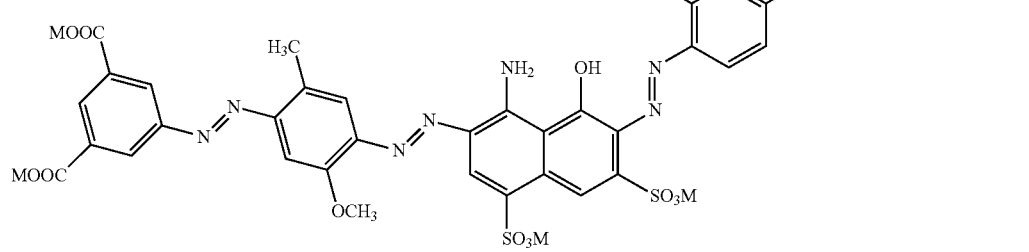
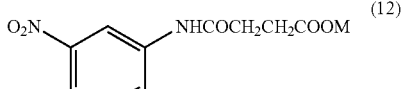
(12)
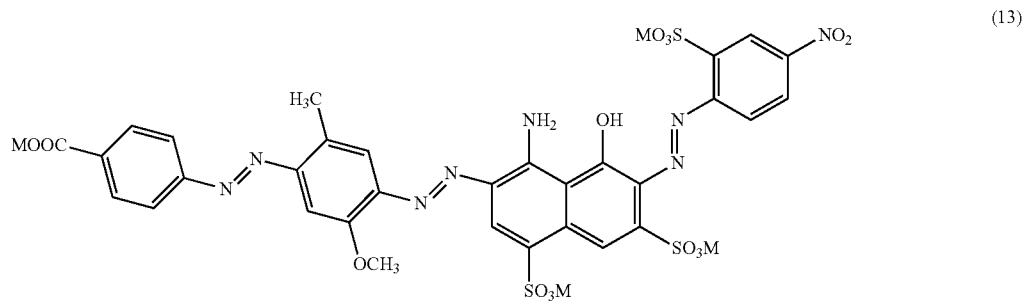
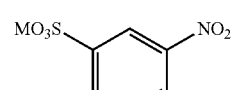
(13)
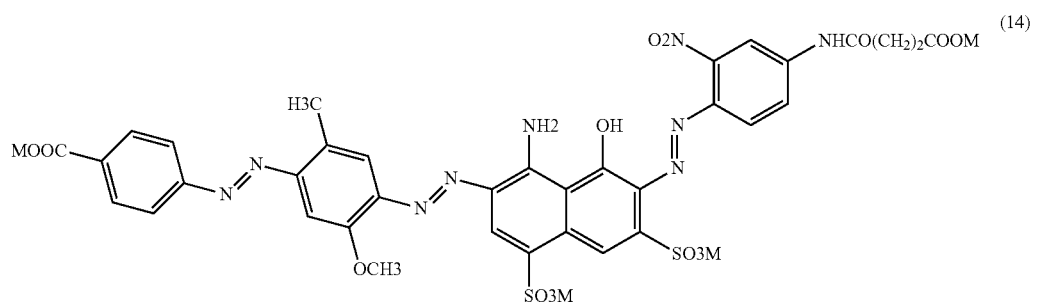
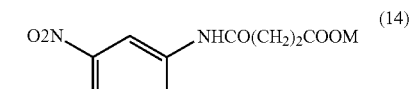
(14)
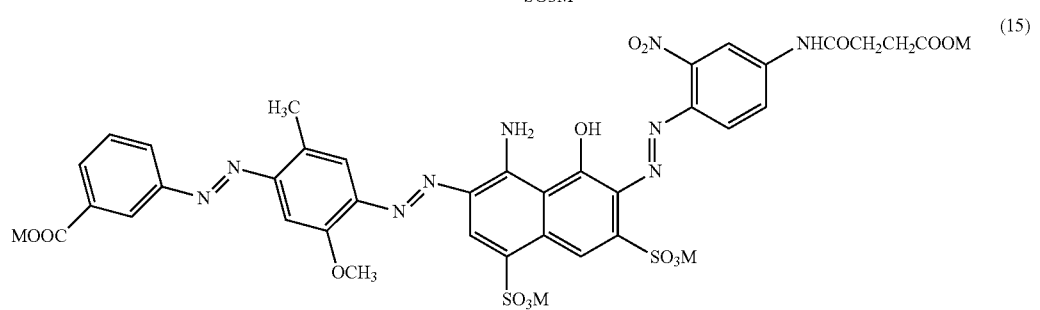
(15)

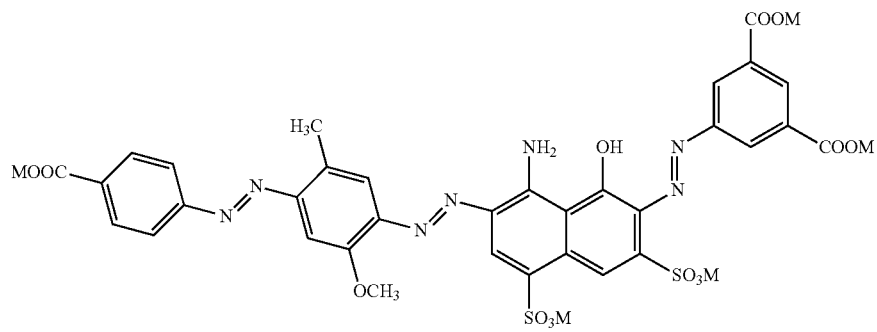
(16)
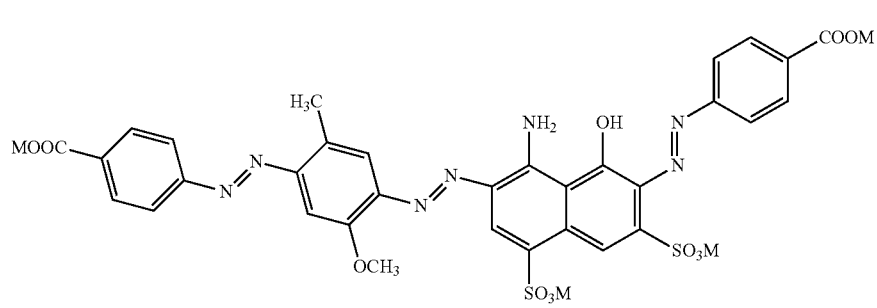
(17)
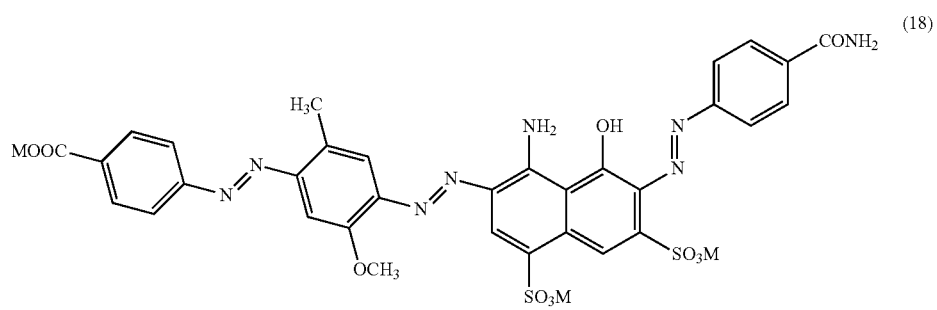
(18)
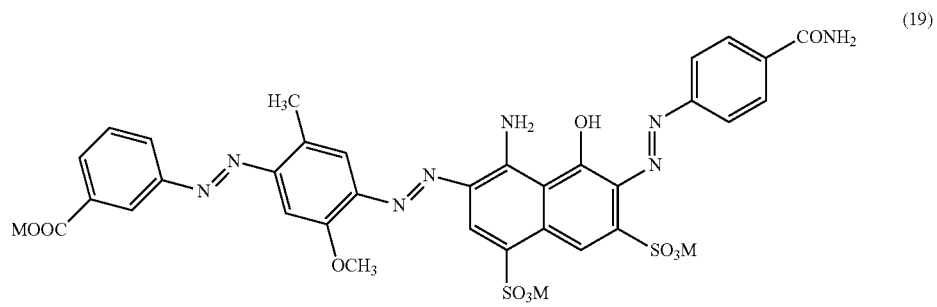
(19)
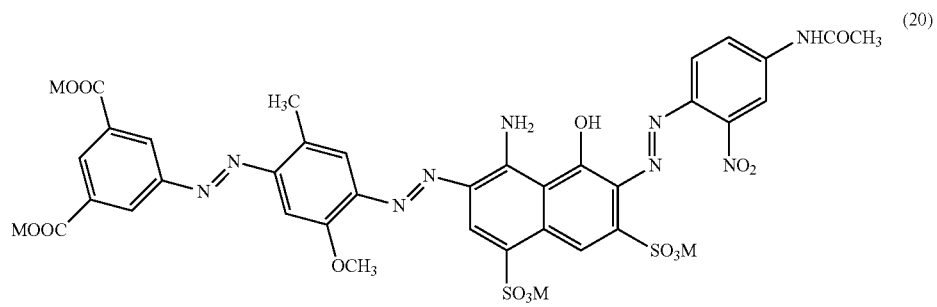
(20)

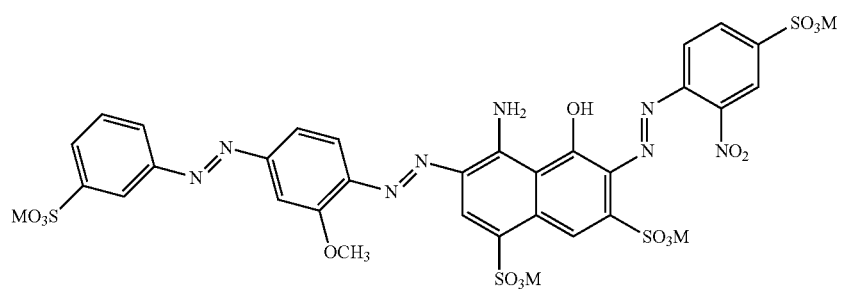
(21)
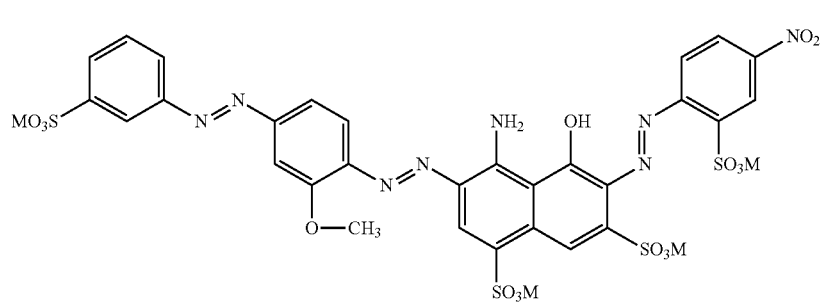
(22)
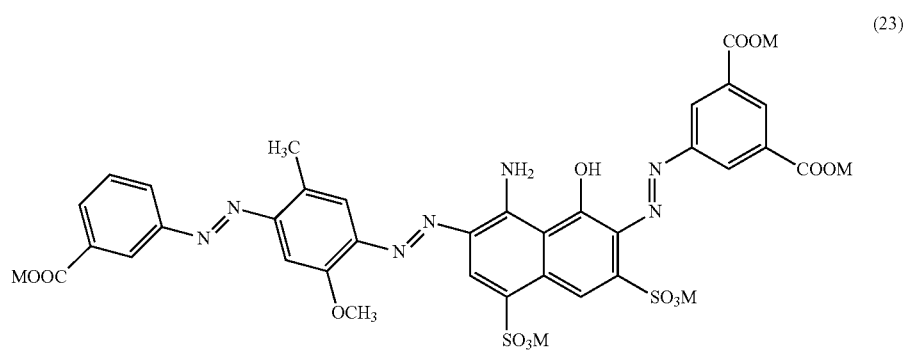
(23)
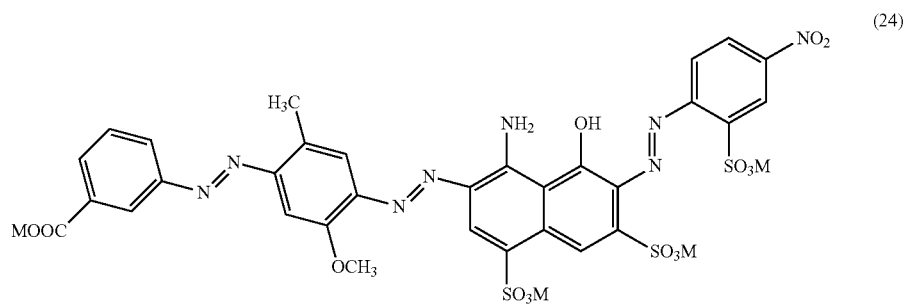
(24)
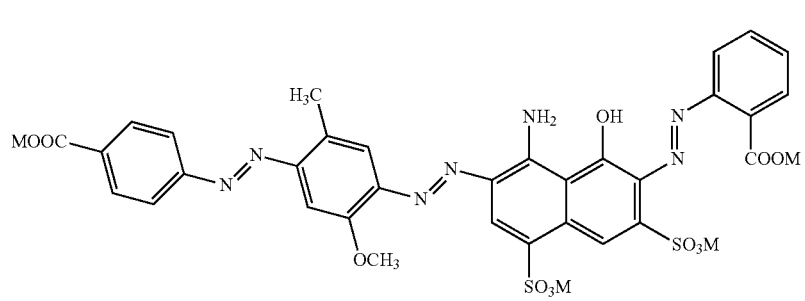
(25)

-continued
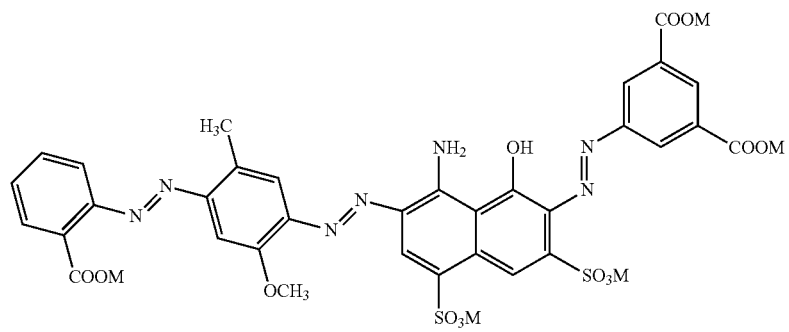
(26)
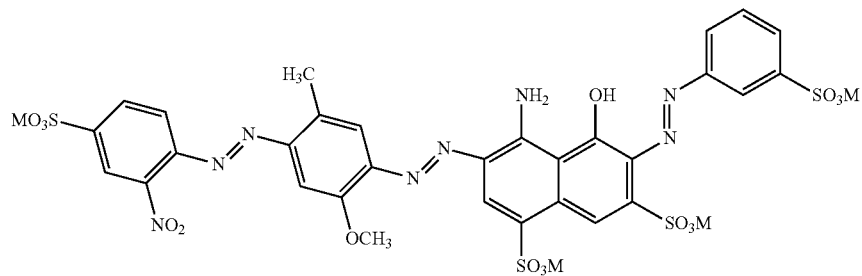
(27)
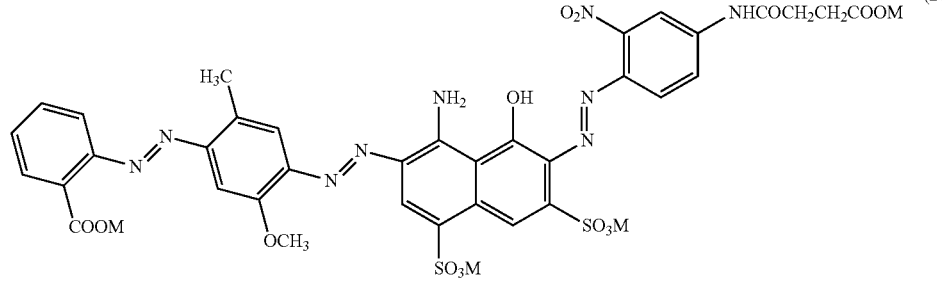
(28)
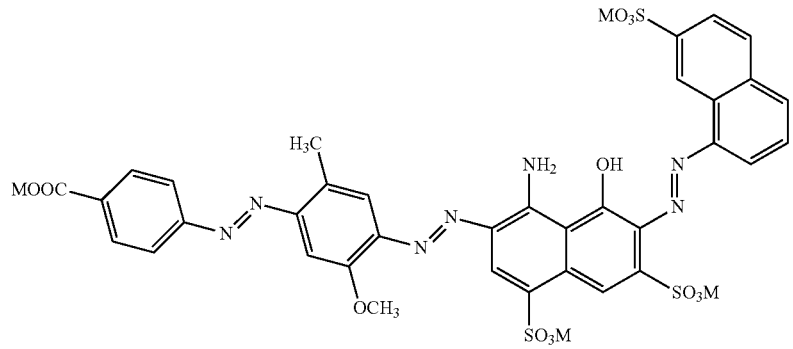
(29)
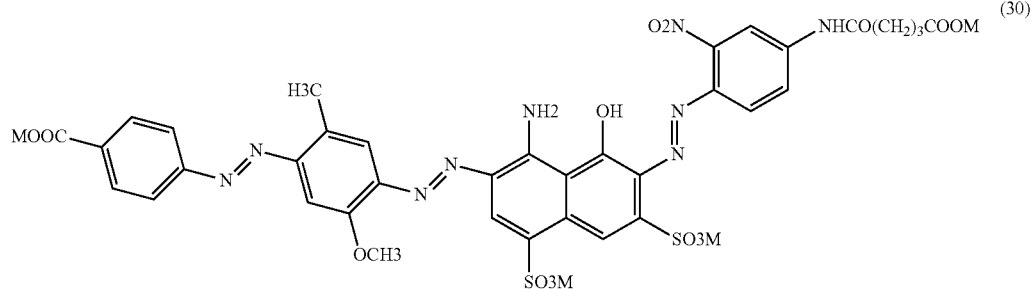
(30)

-continued
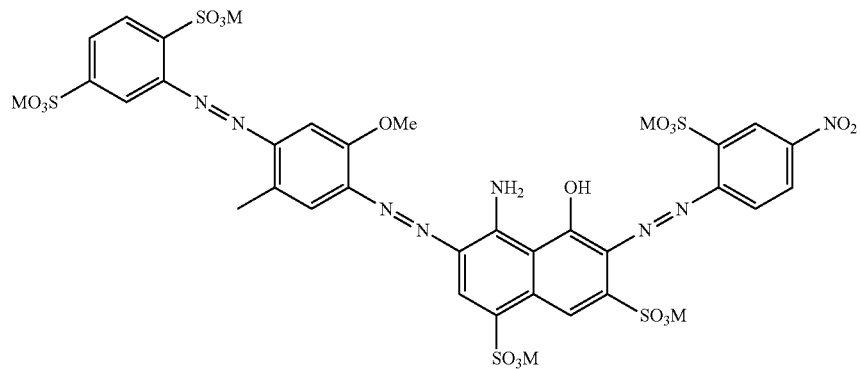
(31)
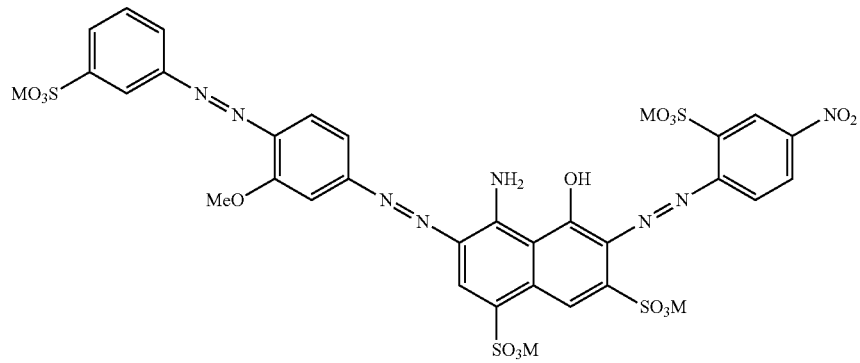
(32)
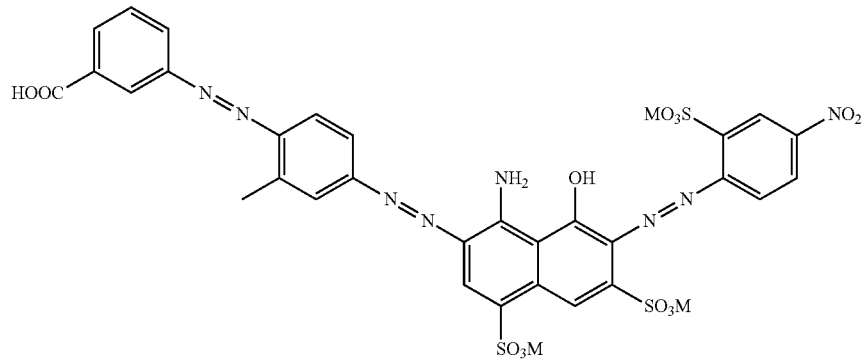
(33)
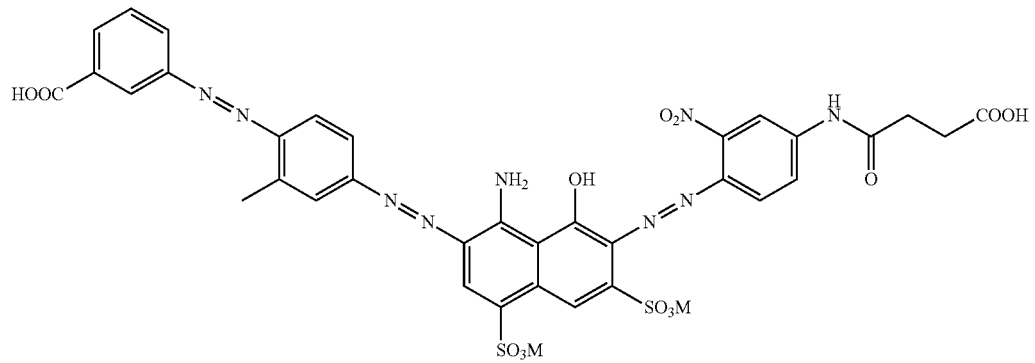
(34)

-continued
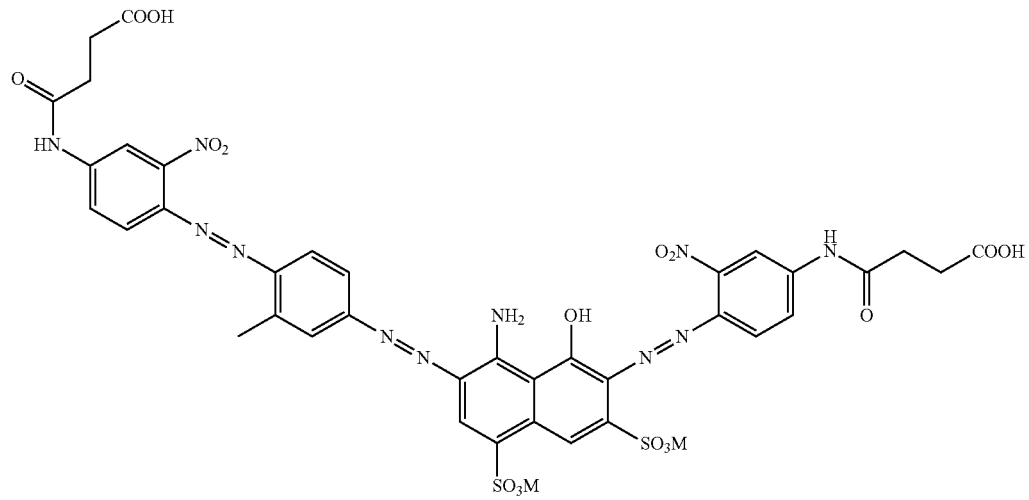
(35)
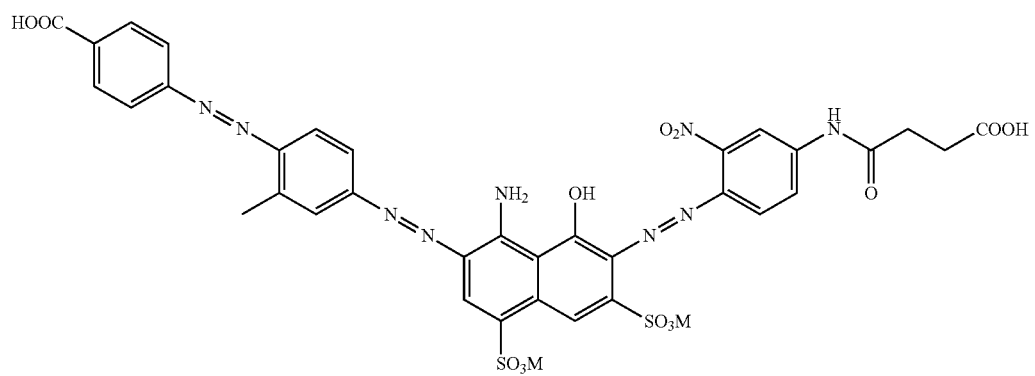
(36)
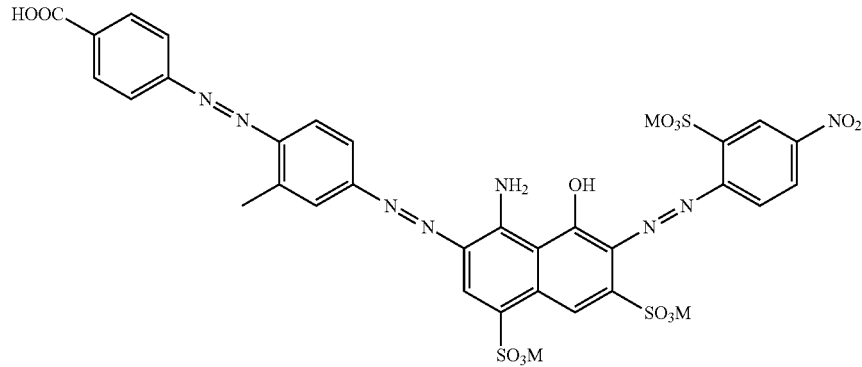
(37)
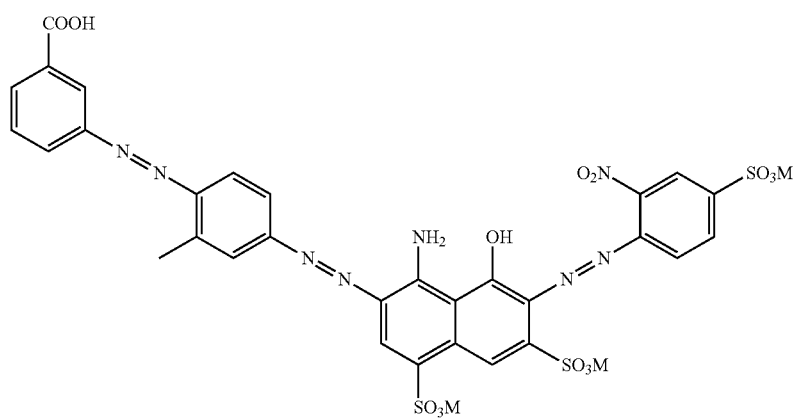
(38)

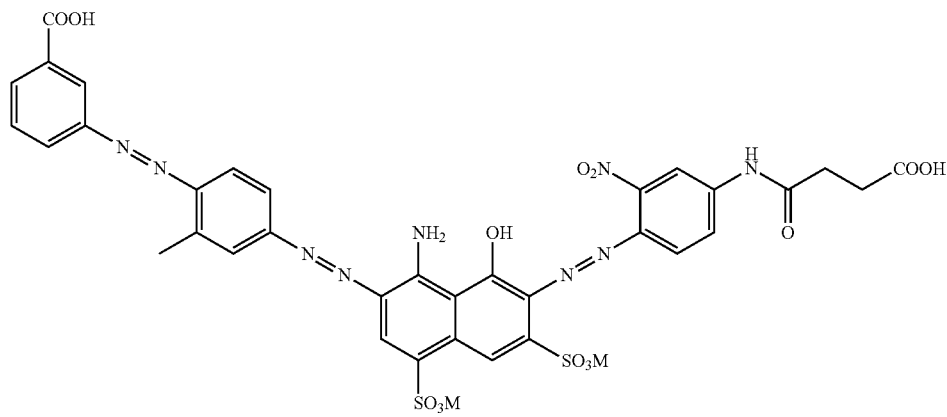

(39)

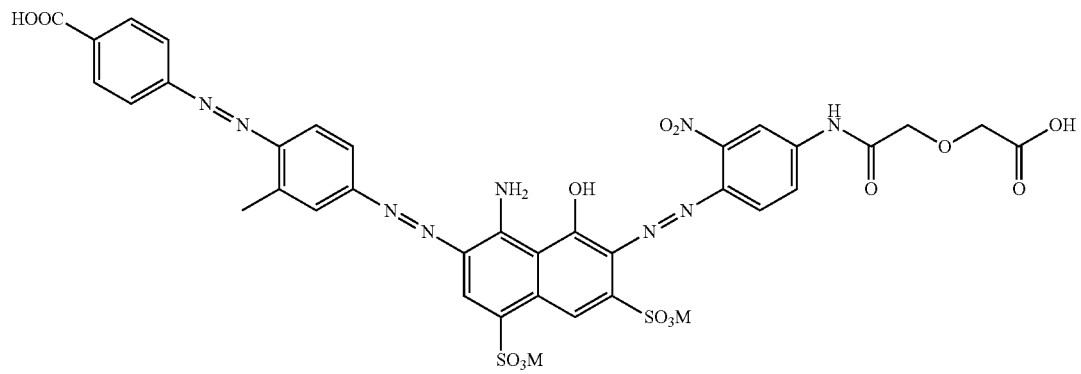

(40)

The prepared trisazo dyes of general formulas (V) are listed in Table 1 together with their absorption maximum in aqueous solution:

TABLE 1

| Farbstoff Nr. | M | $\lambda_{max}$ in $H_2O$ (nm) |
|---|---|---|
| 10 | Na | 610/460 |
| 11 | Na | 600/460 |
| 12 | Na | 621/486 |
| 13 | Na | 600/468 |
| 14 | Na | 622/487 |
| 15 | $Me_2NCH_2CH_2OH$ | 622/484 |
| 16 | Li | 600/464 |
| 17 | Na | 601/475 |
| 18 | Li | 601/468 |
| 19 | Na | 600/468 |
| 20 | $Me_2NCH_2CH_2OH$ | 616/487 |
| 21 | K | 616/459 |
| 22 | Na | 602/456 |
| 23 | Na | 601/462 |
| 24 | Li | 599/466 |
| 25 | Li | 592 |
| 26 | Na | 594 |
| 27 | Na | 608 |
| 28 | Na | 618/481 |
| 29 | Na | 615/495 |
| 30 | NH4 | 622/487 |
| 31 | Na | 608.5/458.5 |
| 32 | Na | 593/450.5 |
| 33 | Na | 593/417 |
| 34 | Na | 610/432 |
| 35 | Na | 602/460.5 |
| 36 | Na | 619/443.5 |
| 37 | Na | 601.5/429.5 |
| 38 | Na | 610.5/433 |
| 39 | Na | 618.5/445 |
| 40 | Na | 618.5/438 |

The trisazo dyes of general formulas (V) may be in the free acid form or in the form of inorganic or organic salts thereof. Preferably, they are in the form of their alkali or ammonium salts, wherein the ammonium cation may be substituted. Examples of such substituted ammonium cations are 2-hydroxyethylammonium, bis-(2-hydroxyethyl)-ammonium, tris(2-hydroxyethyl)-ammonium, bis-(2-hydroxyethyl)-methylammonium, tris-[2-(2-methoxyethoxy)-ethyl]-ammonium, 8-hydroxy-3,6-dioxaoctylammonium and tetraalkylammonium such as tetramethylammonium or tetrabutylammonium.

The invention does not only relate to pure trisazo dyes of general formulas (V), but also to mixtures of these trisazo dyes.

The invention also relates to a method of preparation of the trisazo dyes of general formula (V) according to the invention, wherein an amine of general formula (VI),

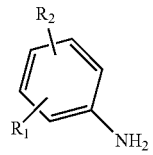

(VIII)

where $R_1$ and $R_2$ are as defined before, is diazotized and subsequently coupled with a compound of general formula (IX),

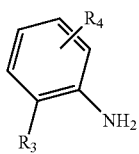

(IX)

where $R_3$ and $R_4$ are as defined before, at an acid value of pH situated between about 1.0 and 3.0 under formation of the intermediate dye of general formula (X).

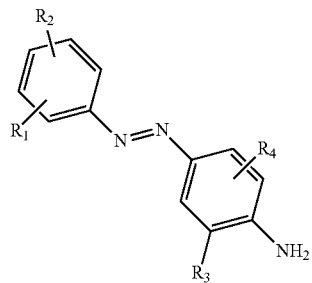

(X)

The intermediate dye of general formula (X), wherein $R_1$, $R_2$, $R_3$ and $R_4$ are as defined before, is diazotized and subsequently coupled with K-Acid at an acidic pH situated between a value of 0.5 and 2.0 under formation of the intermediate dye of general formula (XII) where $R_1$, $R_2$, $R_3$ and $R_4$ are as defined before and M is the metal cation of the base used to maintain the pH during the coupling reaction,

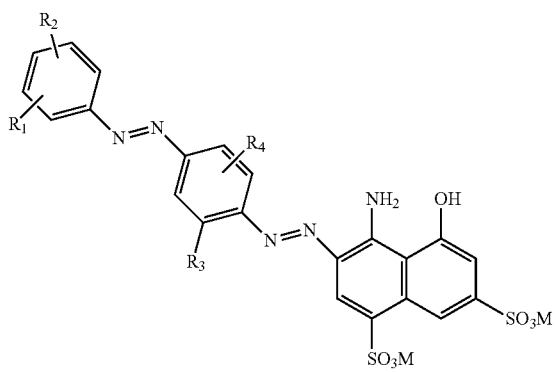

(XII)

The intermediate dye of general formula (XII) is further coupled with a diazo compound of general formula (XII)

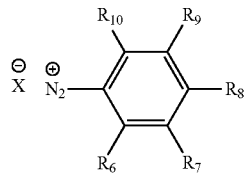

(XIII)

where $R_6$, $R_7$, $R_8$, $R_9$ and $R_{10}$ are as defined before, or of general formula (XIV)

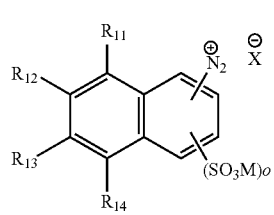

(XIV)

where o, $R_{11}$, $R_{12}$, $R_{13}$ and $R_{14}$ are as defined before and X is the anion of the acid used during the diazotization, at a more or less neutral pH situated between a value of 5.0 and 9.0 under formation of the dyes of general formula (V) according to the invention.

The trisazo dyes of general formulas (V) according to the invention are used for dying cellulose containing materials, paper, cotton, viscose, leather and wool to provide dyed materials with good water fastness and light stability.

All methods well known in the textile and paper industries for dyeing with substantive dyes may be used with the trisazo dyes, preferably for the bulk or surface treatment of sized or unsized paper. The dyes may also be used in the dyeing of yarns and piece goods of cotton, viscose and linen by the exhaustion process from a long liquor or in a continuous process.

The trisazo dyes according to the invention are particularly suitable for recording text and images on recording sheets, coated or uncoated paper, for dyeing or printing of natural or synthetic fiber materials, nanoporous recording sheets, leather and aluminum.

The invention furthermore relates to liquid dye preparations comprising at least one trisazo dye of general formula (V). The use of such liquid dye preparations is particularly preferred for paper dyeing. Such stable, liquid, preferably aqueous, concentrated dye preparations may be obtained by using methods well known in the art, preferably by dissolving in suitable solvents. The possibility of preparation of such stable, aqueous, concentrated preparations in the course of dye synthesis itself, without intermediate isolation of the dye, for example after a desalting step by diafiltration of the reaction solution, is of particular advantage.

Trisazo dyes or mixtures of trisazo dyes of general formula (V) are excellent dyes for the preparation of inks for ink jet printing and for writing utensils.

The trisazo dyes of general formula (V) according to the invention may be combined with toning dyes, in particular dyes as described in patent applications EP 0,755,984, EP 1,219,682, as well as in U.S. Pat. Nos. 5,074,914, 5,684,140 and 5,824,785, in order to obtain a still more neutral black hue.

Such an ink comprises one or more of the trisazo dyes according to the invention in a liquid aqueous medium. The ink contains from 0.5 percent by weight to 20 percent by weight, preferably from 0.5 percent by weight to 8 percent by weight, of these trisazo dyes, based on the total weight of the ink. The liquid medium is preferably water or a mixture of water and water-miscible organic solvents. Suitable solvents are given for example in U.S. Pat. Nos. 4,626,284, 4,703,113, 4,963,189 and patent applications GB 2'289'473, EP 0'425'150 and EP 0'597'672.

The present invention will be illustrated in more detail by the following examples without limiting the scope of the claimed compounds in any way.

Examples

Example 1

The trisazo dye no. 17 was prepared in the following way:
Diazo Component of the Dye
Diazo Suspension A 30.8 g (0.22 Mol) of 4-Aminobenzoic acid (98% ig) were suspended at room temperature in 200 ml of water and then cooled down to a temperature between 0° C. and 5° C. and an aqueous solution of hydrochloric acid (37%) were added drop-wise over a period of 10 minutes at a temperature between 0° C. and 10° C. under stirring and 55 ml of an aqueous solution (4N) of sodium nitrite were slowly added keeping the temperature below 10° C. Afterwards, stirring was continued for 1 hour at a temperature between 0° C. and 5° C. The excess of nitrous acid was removed subsequently by reaction with sulfamic acid.

Preparation of the Dye of Formula (XXV)

28.3 g (0.2 Mol) of 5-Methyl-o-anisidine (97%) were suspended in 200 ml of water and 22 ml of an aqueous solution of hydrochloric acid (37%) and the suspension was stirred for 2 h at room temperature. Afterwards, the suspension was cooled down to a temperature between and 10° C.

The diazo suspension A was added over a period of 30 minutes at an internal temperature between 5° C. and 10° C. to the suspension of the 5-Methyl-o-anisidine keeping the pH at a value between 0.5 and 1 by adding a solution of sodium hydroxide (30%). The addition terminated, stirring was continued for 18 hours at room temperature.

The precipitated was filtered off and washed up with 50 ml of a 3.5% solution of hydrochloric acid. After drying, 45.7 g of the dye of formula (XXV) were obtained.

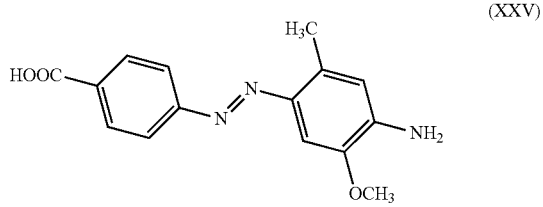 [SMILES: COc1cc(/N=N/c2ccc(C(=O)O)cc2)c(C)cc1N]

(XXV)

Diazo Suspension B 14.3 g (50 mMol) of dye of formula (XXV) were dissolved in 100 ml of water and 10 ml of N-Methylpyrrolidone at 80° C. by adjusting the pH to a value of 9.0 with the addition of a solution of NaOH 30%.

The obtained solution was then cooled down to 0° C. to 5° C. and 12.5 ml of an aqueous solution (4N) of sodium nitrite were added. Under stirring 13 ml of an aqueous solution of hydrochloric acid (37%) were slowly added drop-wise over a period of 10 minutes at a temperature between 0° C. and 10° C. The addition terminated, stirring was continued for 2 hours at this temperature. The excess of nitrous acid was removed subsequently by reaction with sulfamic acid.

Preparation of the Diazo Dye of Formula (XXVI)

21.3 g (50 mMol) of K-acid (CAS: 130-23-4) (75%) were suspended in 200 ml water and 5 ml of an aqueous solution of sodium hydroxyde (30%). The suspension was then stirred 30 minutes at room temperature and then cooled down to 5° C.

The diazo suspension B was added to this suspension over a period of 30 minutes at an internal temperature between 5° C. and 10° C. keeping the pH to a value between 1 and 2 by a simultaneously addition of a saturated solution of sodium acetate. The addition terminated, stirring was continued for 18 hours at room temperature. The thick suspension was then heated to 80° C., and brought into a solution by the addition of a solution of sodium hydroxide (30%) adjusting the pH to a value of 9. The hot solution was then clear filtrated over celite. Dye (XXVI) contained in the filtrate was then precipitated by decreasing the pH to a value of 6 with the addition of acetic acid and by the addition of 10 g sodium chloride.

The intermediate dye (XXVI) was then filtered off and washed up with 50 ml of water. After drying 26.4 g of the dye of formula (XXVI) were obtained.

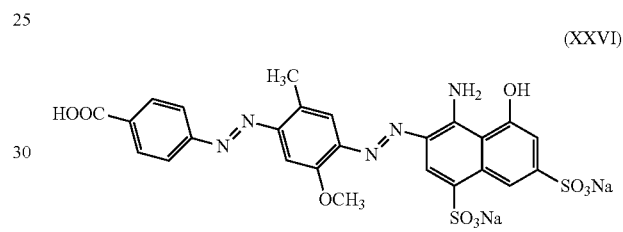

(XXVI)

Diazo Suspension C 30.8 g (0.22 Mol) of 4-Aminobenzoic acid (98%) were suspended in 200 ml of water and then cooled down to a temperature between 5° C. and 10° C. 50 ml of an aqueous solution of hydrochloric (37%) acid were added drop-wise to the suspension over a period of 10 minutes under stirring and 55 ml of an aqueous solution (4N) of sodium nitrite were slowly added keeping the temperature between 0° C. and 10° C. The excess of nitrous acid was removed by reaction with sulfamic acid.

Preparation of Trisazo No. 17 (17)

7.4 g (12 mMol) of dye of formula (XXVI) were suspended in 100 ml water and cooled down to 0° C. to 5° C. Afterwards, 12 mMol of the Diazo suspension C were slowly added to the suspension over a period of 30 min keeping the temperature below 5° C. and maintaining the pH at a value of 6.0 to 7.5 by a simultaneous addition of a solution of sodium hydroxide (20%).

The addition terminated, stirring was continued for 2 hours at a temperature between 0° C. and 5° C. and then allowed to warm up to Room temperature. After 2 hours the dark solution was clear filtered and the filtrate was concentrated with a rotating evaporator. The dye No. 17 was then precipitated by the addition of methanol and filtered off.

The raw dye was purified with 60 ml of an aqueous solution (80%) of ethanol. After drying, 6 g of dye 17 in the form of its sodium salt were obtained.

The trisazo dyes no. (10) to (16) and (18) to (40) according to the invention may be prepared in a similar way by using appropriate starting materials, for example as outlined in the following in regard to the trisazo dyes no. (31) to (40):

Preparation of (A) idem preparation of the dye of formula (XXVI). However, 3-aminobenzoic acid and m-toluidine were used in place of 4-aminobenzoic acid and 5-Methyl-o-anisidine, respectively.

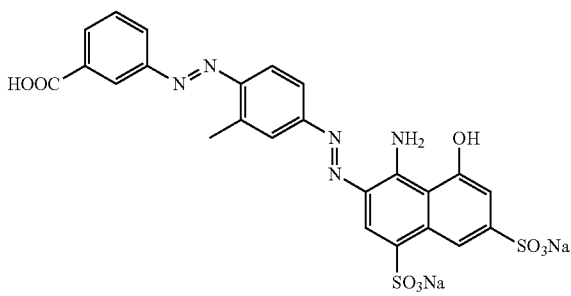

(A)

Preparation of (B) idem preparation of the dye of formula (XXVI). However m-toluidine was used in place of 5-Methyl-o-anisidine.

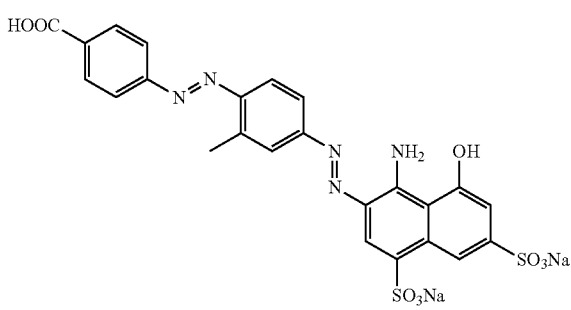

(B)

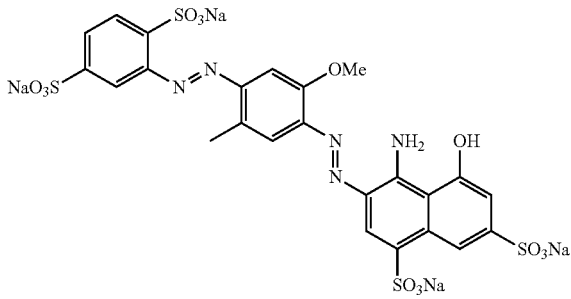

(C)

Preparation of (D) idem preparation of the dye of formula (XXVI). However, 3-aminobenzene sulfonic acid and m-methoxyaniline were used in place of 4-aminobenzoic acid and 5-Methyl-o-anisidine, respectively.

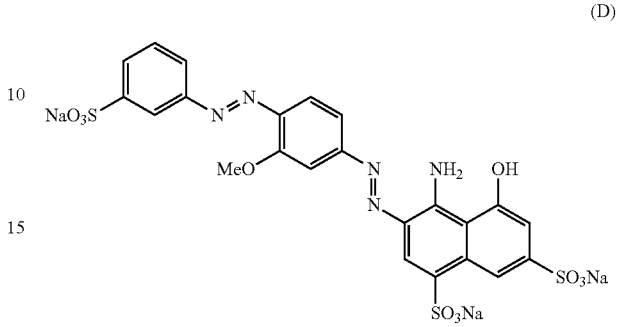

(D)

Preparation of (E) idem preparation of the dye of formula (XXVI). However, 4-[(4-amino-3-nitrophenyl)amino]-4-oxobutanoic acid and m-toluidine were used in place of 4-aminobenzoic acid and 5-Methyl-o-anisidine, respectively.

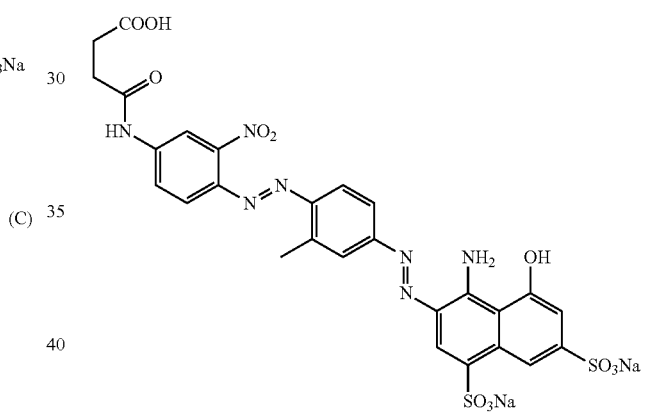

(E)

Example 2: Compound 31

Diazo (C) and 4-Nitroaniline 2 sulfonic acid was used in place of Diazo (XXVI) and 4-Aminobenzoic acid of example 1.

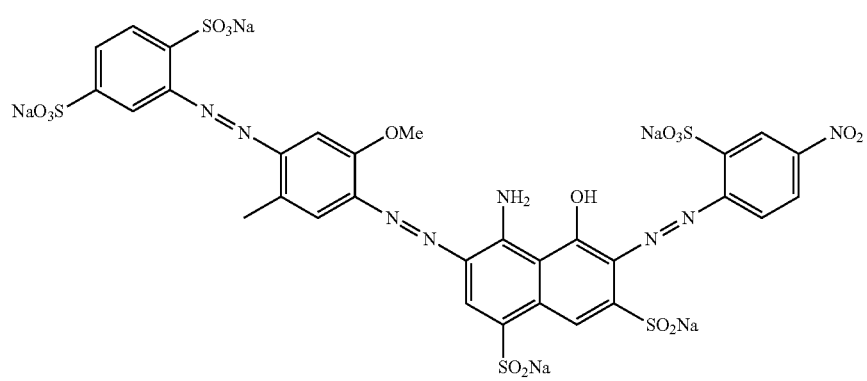

(31)

Example 3: Compound 32
Diazo (D) was used in place of Diazo (C) of example 2.
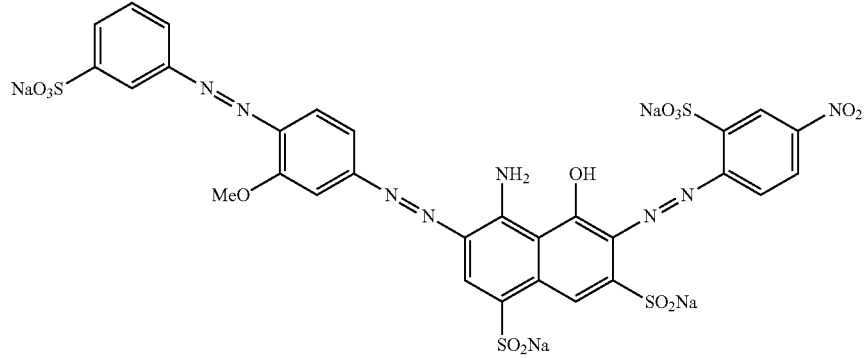
(32)
Example 4: Compound 33
Diazo (A) was used in place of Diazo (c) of example 2.
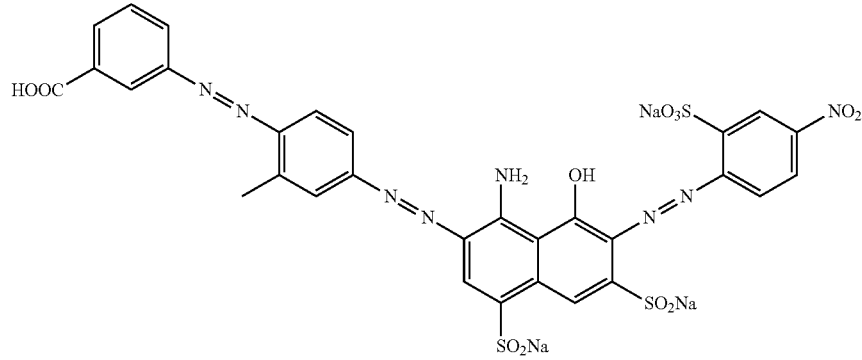
(33)
Example 5: Compound 34
4-[(4-amino-3-nitrophenyl)amino]-4-oxobutanoic acid was used in place of 4-Nitroaniline 2 sulfonic acid of example 4
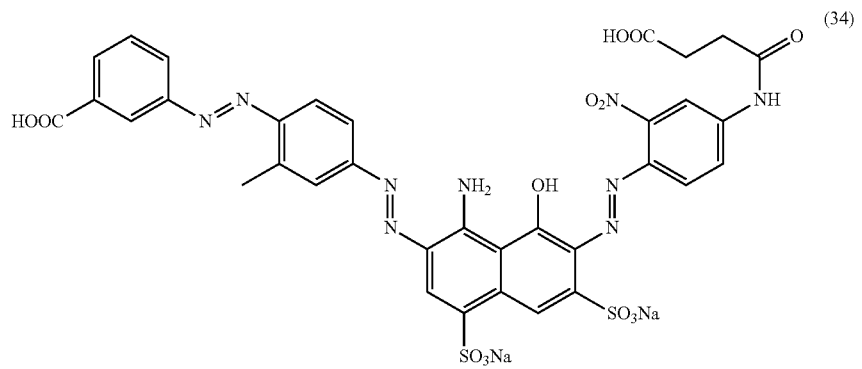
(34)

Example 6: Compound 35
Diazo (E) was used in place of Diazo (A) of example 5.
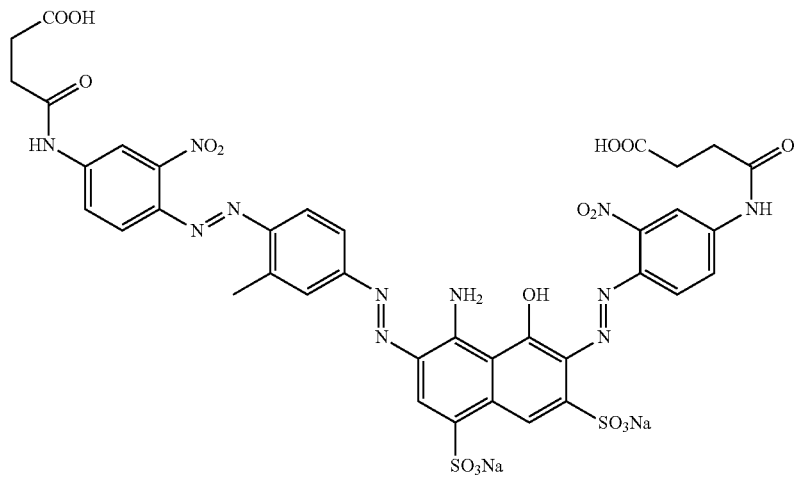
(35)
Example 7: Compound 36
Diazo (B) was used in place of diazo (A) of example 5.
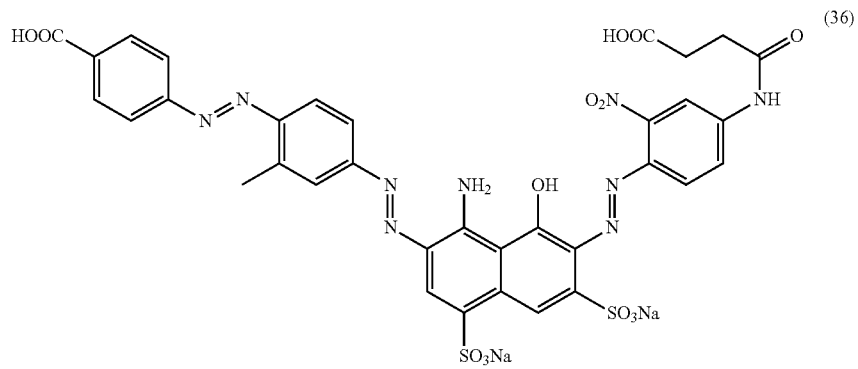
(36)
Example 8: Compound 37
4-Nitroaniline 2 sulfonic acid was used in place of 4-[(4-amino-3-nitrophenyl)amino]-4-oxobutanoic acid of example 7.
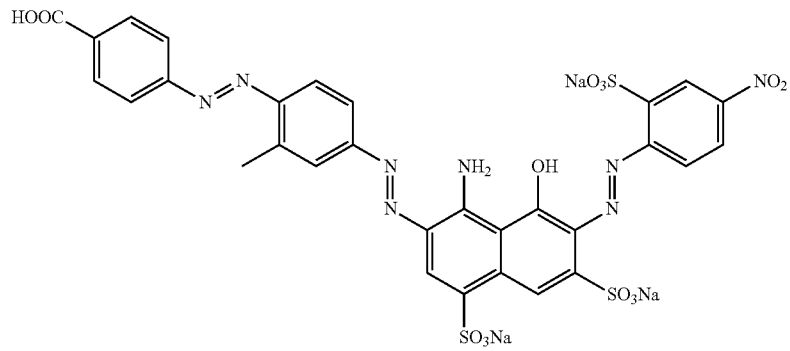
(37)

Example 9: Compound 38

Diazo (A) and 2-Nitroaniline 4-sulfonic acid were used in place of Diazo (B) and 4-Nitroaniline 2-sulfonic acid of example 8, respectively.

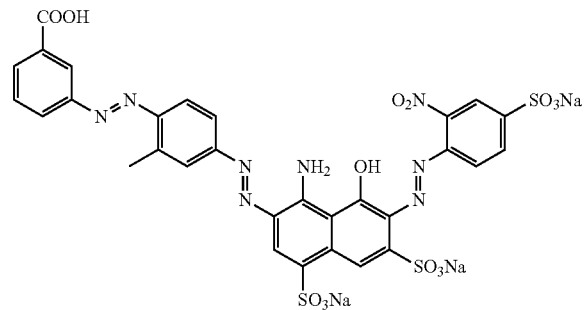

(38)

Example 10: Compound 39

4-[(4-amino-3-nitrophenyl)amino]-4-oxobutanoic acid was used in place of 2-Nitroaniline 4 sulfonic acid of example 9.

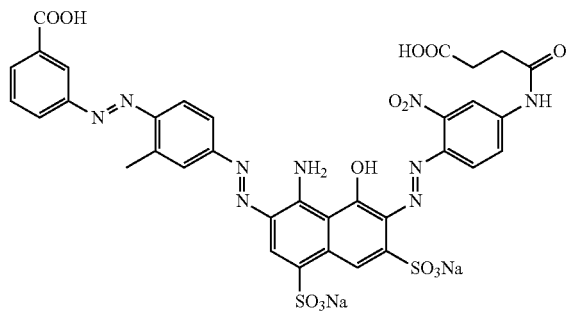

(39)

Example 11: Compound 40

3-{3-[(4-amino-3-nitrophenyl)amino]-3-oxopropoxy}propanoic acid was used in place of 4-[(4-amino-3-nitrophenyl)amino]-4-oxobutanoic acid of example 7.

Example of Ink Preparation

The present invention, as far as it relates to inks, is illustrated by the following examples using trisazo dyes according to the invention, listed in Table 1, and dyes representing the state of the art. For each dye, 100 g of ink were prepared by heating the necessary amount of dye (4-9 g), propylene glycol (5 g), butyl carbitol (5 g), Surfinol 465 (0.5 g, available from Air Products®) and a solution of the biocide Mergal K 10N (0.2 g, available from Riedel-de-Haën, Seelze, Germany) together with water to a temperature of 50° C. under stirring for approximately 1 hour. The resulting solution was cooled down to a temperature of 20° C., its value of pH was adjusted to 7.5 and the solution was passed through a Millipore® filter of 0.5 μm pore diameter. The dye quantity was adjusted in such a way that the optical density of the printed image was similar for all the dyes.

Example of Application of Recording Liquids

The recording liquids were subsequently printed with an ink jet printer Canon Pixma IP4300 onto the following recording sheets:
1) START® PRINT IT ALL High Volume Printing Paper (75 g/m2
and
2) HP® Printing Paper (CHP 150)

Tests (A) Light Stability

The printed samples were irradiated using a Weather-Ometer® Ci4000 (available from Atlas Material Testing Technology. Chicago, USA) with a 6500 W xenon lamp at a temperature of 20° C. and relative humidity of 50% until an illumination of 20 megalux hours was reached. The density loss was measured with a densitometer Spectrolino®. The percent density loss of initial density gives an indication of the light stability of the dyes on the printed recording sheet.

(B) Color Coordinates

The color coordinates L*a*b* of the printed samples were measured with a spectrophotometer Spectrolino® (available from Gretag Macbeth, Regensdorf, Switzerland).

(C) Waterfastness

Patterns were printed on recording media 1 and 2 and tested as described in ISO test 18935:2005(E), Method 3—Water soak, with the following differences:
a. the time of immersion in the present tests was set than 1 minute compared ISO 18935:2005(E), in which the time of immersion is set to 1 hour,
b. only black pattern are prepared according to the procedure described above.

(40)

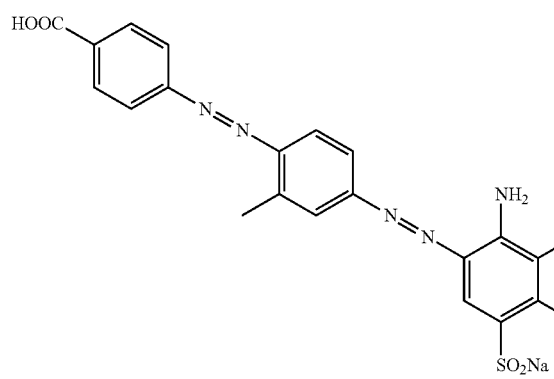

First, the optical density (UnsoakedPattern OD) of the coloured patterns on the samples was measured with a Spectrolino® densitometer 1 day after it has been printed. Then the samples with the patterns were immersed into de-ionized water at ambient temperature for 1 minute. Then, the samples with the patterns were removed and hung vertically to dry for 1 hour. Separate containers were used for each sample to avoid cross contamination. The optical density (SoakedPattern OD) of the coloured, water-treated patterns was measured with a Spectrolino® densitometer. The calculated percent water-fastness is given according the following formula:

$$\text{Optical Density Loss} = \left(1 - \frac{(SoakedPatternOD)}{(UnsoakedPatternOD)}\right) * 100\%$$

Low values of Optical Density Loss indicate good water fastness of a dye.

Results

The measured values of L*a*b* (illuminant $D_{65}$) of the trisazo dyes according to the invention and the trisazo dyes (I) and (II) representing the state of the art are listed in Table 2.

TABLE 2

| Dyes Nr. | L*a*b*-Value recording sheet 1 | L*a*b*-Value recording sheet 2 |
| --- | --- | --- |
| 12 | 33.1/−0.4/−3.7 | 32.4/1.4/−0.8 |
| 14 | 34.2/1.4/−0.8 | 33.2/3.0/2.2 |
| (I) | 32.2/−3.4/−14.8 | 33.8/3.7/−10.4 |
| (II) | 31.1/−0.5/−3.1 | 31.5/1.3/1.6 |

A comparison of the measured L*a*b* values in Table 2 immediately shows that inks containing the trisazo dyes according to the invention give black image regions having lower values of b* in comparison to image regions printed with inks containing the trisazo dye (I). The trisazo dyes according to the invention are therefore particularly suitable in ink jet printing, because they allow a more neutral reproduction of blacks comparable to dye (II) representing the start of the art.

A comparison of the measured density losses of printed samples in Table 3 immediately shows that the trisazo dyes (12) and (14) according to the invention have a considerably improved light stability in comparison to the trisazo dyes (I) and (II) representing the state of the art.

TABLE 3

| Dye Nr. | Density loss in percent Red-/Green-/Yellow-channel Recording sheet 1 | Density loss in percent Red-/Green-/Yellow-channel Recording sheet 2 |
| --- | --- | --- |
| 12 | −5.9/−5.2/−5.1 | −1.9/−1.9/−3.8 |
| 14 | −5.1/−3.0/−4.6 | 0/−0.9/−3.4 |
| (I) | −34/−24/−11.6 | −5.9/−9.5-6.0 |
| (II) | −19.8/−15.1/−11.9 | −6.1/−5.1/−6.9 |

The waterfastness (WF) on the recording sheets 1 and 2 are listed in Table 4

TABLE 4

| | Water-fastness (WF) | | | |
| --- | --- | --- | --- | --- |
| | Recording sheet 1 | | Recording sheet 2 | |
| Dye | Optical Density vis. at 100% print density | WF [%] | Optical Density vis. at 100% print density | WF [%] |
| 12 | 1.12 | 18.4 | 1.14 | 3.1 |
| 14 | 1.1 | 6.3 | 1.12 | 0 |
| (I) | 1.2 | 38.0 | 1.1 | 5.1 |
| (II) | 1.2 | 2.0 | 1.15 | 0 |

With regard to the light-fastness and water-fastness respectively reported in Table 3 and 4, dyes 12 and 14 have a considerably better light and water-fastness than commercial dye (1) and much better light fastness than commercial dye (II) representing the start of the art.

This means that the waterfast ink jet printed black images using the trisazo dyes according to the invention fade much less than black images containing the known trisazo dyes representing the state of the art.

The invention claimed is:
1. A trisazo dye of general formula (V):

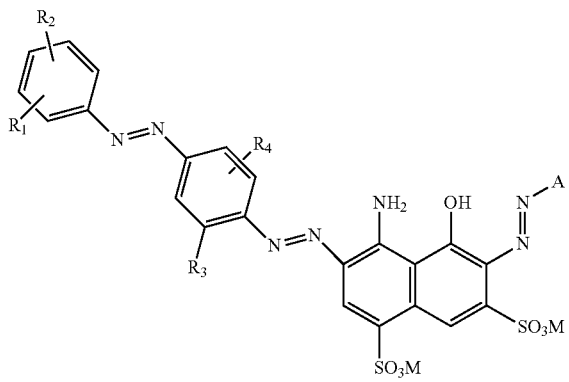

(V)

where
M is selected from the group consisting of H, a metal cation, an ammonium cation $N(H_k R^5_m)$,
wherein
each $R^5$ is selected from the group consisting of —H, an substituted or unsubstituted, saturated or unsaturated aliphatic group having 1 to 18 carbon atoms, and
k is an integer selected from 0, 1, 2, 3, 4 and
m=4−k,
where
$R_1$, $R_2$ independently represent a hydrogen atom, a $SO_3M$ group, a COOM group, a halogen atom, a $NO_2$ group, an ester group, an alkyl- or alkoxy group each having from 1 to 6 carbon atoms, an unsubstituted or substituted amide or sulfonamide group or sulfone group each having up to 12 carbon atoms, wherein the substituents are selected from the group consisting of COOM, OH, $OCH_3$, $NH_2$, Cl, $COOCH_3$, $COOCH_2CH_3$, $CH_3$, $CH_2CH_2COOM$, $(CH_2)_3COOM$ and $CH_2OCH_2COOM$,
where
$R_3$, $R_4$ independently represent a hydrogen atom, an alkyl- or alkoxy group each having from 1 to 6 carbon atoms, an unsubstituted or substituted amide or sulfonamide group each having up to 6 carbon atoms, wherein the substituents are selected from the group consisting of COOM, OH, OCH$_3$, NH$_2$, Cl, COOCH$_3$, COOCH$_2$CH$_3$, CH$_3$, CH$_2$CH$_2$COOM, (CH$_2$)$_3$COOM and CH$_2$OCH$_2$COOM, where either A represents a moiety of general formula (VI):

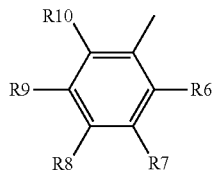

(VI)

wherein

R$_6$, R$_7$, R$_8$, R$_9$, R$_{10}$ independently represent a hydrogen atom, a SO$_3$M group, a NO$_2$ group, a nitrile group, an amino group, a COOM group, a halogen atom, an ester group, an alkyl or alkoxy group each having from 1 to 2 carbon atoms, an unsubstituted or substituted amide or sulfonamide group or sulfone group each having up to 6 carbon atoms, wherein the substituents are selected from the group consisting of COOM, Cl, OH, OCH$_3$, COOCH$_3$, COOCH$_2$CH$_3$, CH$_3$, CH$_2$CH$_2$COOM, (CH$_2$)$_3$COOM and CH$_2$OCH$_2$COOM;

or A represents a moiety of general formula (VII):

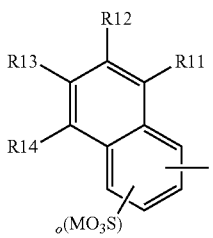

(VII)

wherein o is 0 or 1 and

R$_{11}$, R$_{12}$, R$_{13}$, R$_{14}$ independently represent a hydrogen atom, a SO$_3$M group, a NO$_2$ group, a COOM group, an unsubstituted or substituted amide or sulfonamide group having up to 6 carbon atom, wherein the substituents are selected from the group consisting of COOM, OH, OCH$_3$, NH$_2$, Cl, COOCH$_3$, COOCH$_2$CH$_3$, CH$_3$, CH$_2$CH$_2$COOM, (CH$_2$)$_3$COOM and CH$_2$OCH$_2$COOM.

2. The trisazo dye of general formula (V) according to claim 1, wherein

R$_1$, R$_2$ independently represent a hydrogen atom, a SO$_3$M group, a COOM group, an unsubstituted or substituted amide or sulfonamide group each having up to 6 carbon atoms, wherein the substituents are selected from the group consisting of COOM, COOCH$_3$, COOCH$_2$CH$_3$, CH$_3$, CH$_2$CH$_2$COOM, (CH$_2$)$_3$COOM and CH$_2$OCH$_2$COOM, R$_3$, R$_4$ independently represent a hydrogen atom, an alkyl- or alkoxy group each having from 1 to 2 carbon atoms, an unsubstituted or substituted amide or sulfonamide group each having up to 6 carbon atoms, wherein the substituents are selected from the group consisting of COOM, OH, OCH$_3$, COOCH$_3$, COOCH$_2$CH$_3$, CH$_3$, CH$_2$CH$_2$COOM, (CH$_2$)$_3$COOM and CH$_2$OCH$_2$COOM A represents a moiety of general formula (VI)

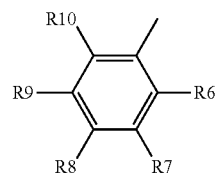

(VI)

where

R$_6$, R$_{10}$ independently represent a hydrogen atom, a SO$_3$M group, a NO$_2$ group, a COOM group, and R$_7$, R$_9$ independently represent a hydrogen atom, a COOM group, and R$_8$ represents a hydrogen atom, a SO$_3$M group, a NO$_2$ group, a substituted amide or sulfonamide group or sulfone group having up to 6 carbon atoms, wherein the substituents are selected from the group consisting of COOM, OH, OCH$_3$, NH$_2$, Cl, COOCH$_3$, COOCH$_2$CH$_3$, CH$_3$, CH$_2$CH$_2$COOM, (CH$_2$)$_3$COOM and CH$_2$OCH$_2$COOM.

3. The trisazo dye of the general Formula (V) according to claim 2, wherein

A represents a moiety of general formula (VI)

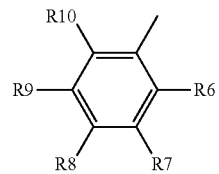

(VI)

where

R$_6$, R$_{10}$ independently represent a hydrogen atom, a SO$_3$M group, a NO$_2$ group, and R$_7$, R$_9$ represent a hydrogen atom, and R$_8$, represents a SO$_3$M group, a NO$_2$ group, a substituted amide or sulfonamide group having up to 6 carbon atoms, wherein the substituents are selected from the group consisting of COOM, COOCH$_3$ COOCH$_2$CH$_3$, CH$_3$, CH$_2$CH$_2$COOM, (CH$_2$)$_3$COOM and CH$_2$OCH$_2$COOM.

4. The trisazo dye of general formula (V) according to claim 1, wherein

R$_1$, R$_2$ independently represent a hydrogen atom, or a COOM group,

R$_3$, R$_4$ independently represent a hydrogen atom, an alkyl- or alkoxy group each having from 1 to 2 carbon atoms, A represents a moiety of general formula (VI)

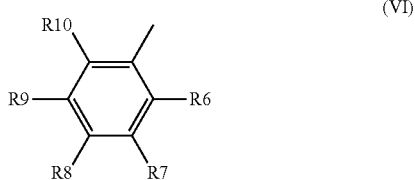

where $R_6$, $R_{10}$ independently represent a hydrogen atom, a $SO_3M$ group, or a $NO_2$ group, and $R_7$, $R_9$ represent a hydrogen atom, and $R_8$ represents a $SO_3M$ group, a $NO_2$ group, a substituted amide or sulfonamide group or sulfone group having up to 6 carbon atoms, wherein the substituents are selected from the group consisting of $CH_3$, $CH_2CH_2COOM$, $(CH_2)_3COOM$ and $CH_2OCH_2COOM$.

5. The trisazo dye of general formula (V) according to claim 4, wherein $R_8$ represents a $NO_2$ group, a $NHCOCH_3$ group, $NHCOCH_2CH_2COOM$ group, $NHCO(CH_2)_3COOM$ group or a $NHCOCH_2OCH_2COOM$ group.

6. A process for recording text and images on recording sheets and for dying and printing of natural or synthetic fiber materials, nanoporous materials, leather and aluminum comprising: applying thereto a black trisazo dye or a mixture of black trisazo dyes according to claim 1.

7. The process of claim 6, wherein record or printing occurs by inkjet printing, writing utensil, or in dyeing solutions for manufacturing color filters for optical and opto-electronic applications.

8. Recording liquids for ink jet printing and for writing utensils comprising at least one trisazo dye or a mixture of trisazo dyes according to claim 1.

9. The recording liquids for ink jet printing and for writing utensils according to claim 8 further comprising: one or more other dyes.

10. A liquid dye preparation comprising at least one trisazo dye or a mixture of trisazo dyes according to claim 1.

11. The liquid dye preparation according to claim 10, wherein a liquid phase comprises the one or more trisazo dyes and wherein the amount of the dyes in the liquid phase is in the range of from 0.5 to 20 wt.-%, based on the total weight of the liquid phase.

12. The liquid dye preparation according to claim 11, wherein the liquid phase further comprises one or more of the following components: N-methyl-2-pyrrolidone, 2-pyrrolidone, 2-hexylpyrrolidone, hydroxyethyl-pyrrolidone, 1,2-hexanediol, 1,2-butanediol, trimethylolpropane, diethylene glycol-monobutylether, triethylene glycol-monobutylether, dipropylene glycol-monobutylether, glycerine, butyl lactate, sulfolane, glycol ether solvents, biocide in a range of from 0.01 to 50 wt-%, based on the total weight of the liquid phase.

13. A method for applying a liquid comprising one or more of the trisazo dyes according to claim 1 in a liquid aqueous medium on a substrate comprising at least the following steps:

(a) providing a substrate, and (b) providing a reservoir comprising the dye-containing liquid, (c) transferring of at least a part of the dye-containing liquid from the reservoir to the substrate, and (d) removing of water, and if applicable other optional solvents, from the substrate.

14. A printed article, comprising:

(A) a substrate, and (B) a layer comprising at least one trisazo dye according to claim 1.

15. The trisazo dye of general formula (V) according to claim 1, wherein $R_1$, $R_2$ independently represent a hydrogen atom, a COOM group, or a $SO_3M$ group, $R_3$, $R_4$ independently represent a hydrogen atom, an alkyl- or alkoxy group each having from 1 to 2 carbon atoms, A represents a moiety of general formula (VI)

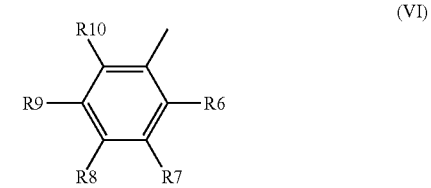

where $R_6$, $R_{10}$ independently represent a hydrogen atom, a $SO_3M$ group, or a $NO_2$ group, and $R_7$, $R_9$ represent a hydrogen atom, and $R_8$ represents a $SO_3M$ group, a $NO_2$ group, a substituted amide or sulfonamide group or sulfone group having up to 6 carbon atoms, wherein the substituents are selected from the group consisting of $CH_3$, $CH_2CH_2COOM$, $(CH_2)_3COOM$ and $CH_2OCH_2COOM$.

16. The trisazo dye of claim 15 comprising general formula (31):
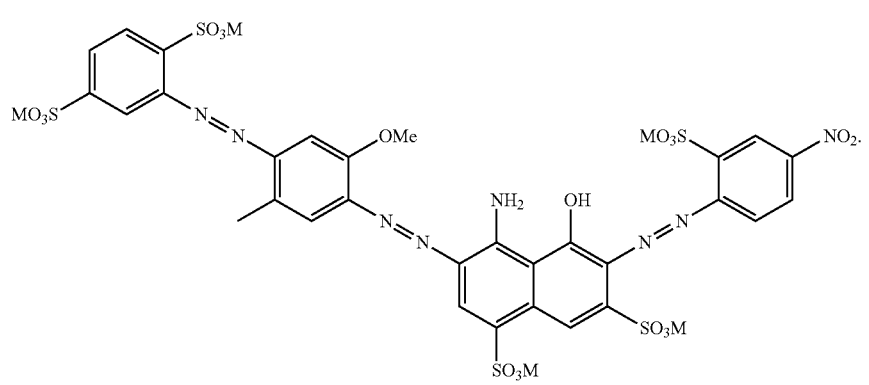
(31)
17. The trisazo dye of claim 15 comprising general formula (40):
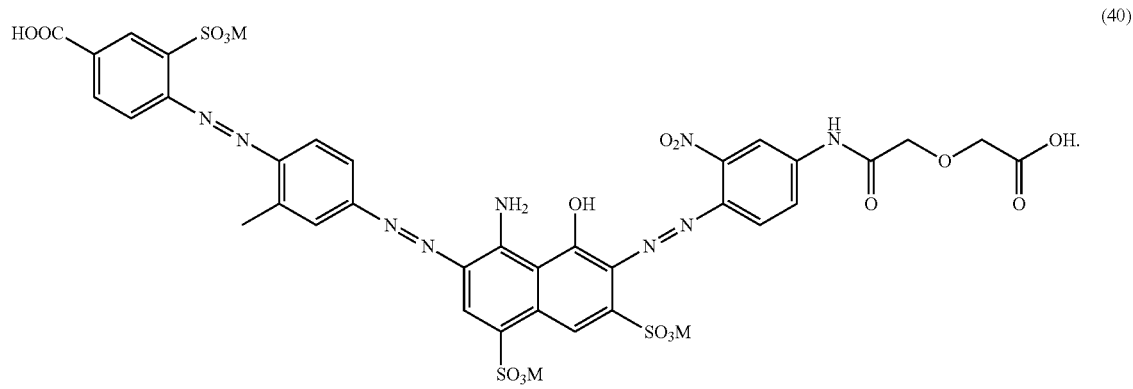
(40)
18. The trisazo dye of claim 15 comprising the following general formula:
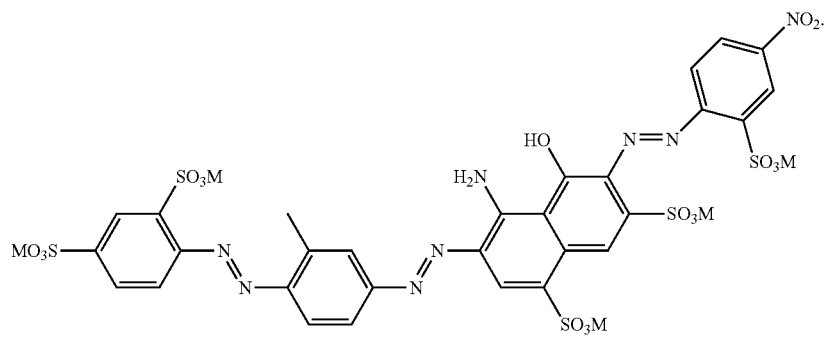

19. A method of preparation of a trisazo dye according to general formula (V)

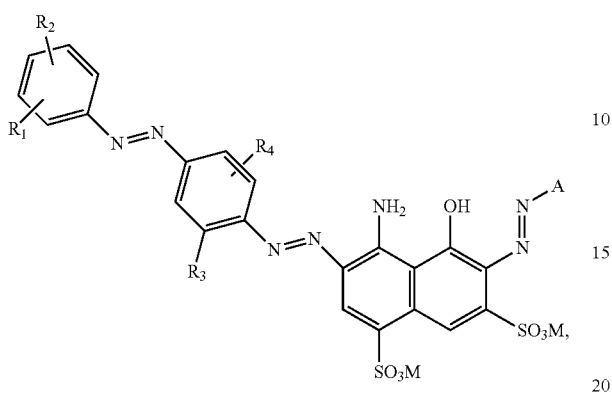
(V)

wherein
an amine of general formula (VIII)

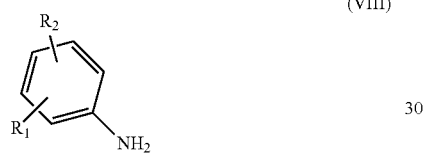
(VIII)

where $R_1$ and $R_2$ independently represent a hydrogen atom, a $SO_3M$ group, a COOM group, a halogen atom, a $NO_2$ group, an ester group, an alkyl- or alkoxy group each having from 1 to 6 carbon atoms, an unsubstituted or substituted amide or sulfonamide group or sulfone group each having up to 12 carbon atoms, wherein the substituents are selected from the group consisting of COOM, OH, $OCH_3$, $NH_2$, Cl, $COOCH_3$, $COOCH_2CH_3$, $CH_3$, $CH_2CH_2COOM$, $(CH_2)_3COOM$ and $CH_2OCH_2COOM$,
is diazotized and subsequently coupled with a compound of general formula (IX),

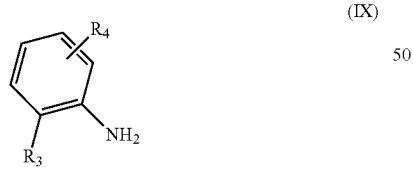
(IX)

where $R_3$ and $R_4$ independently represent a hydrogen atom, an alkyl- or alkoxy group each having from 1 to 6 carbon atoms, an unsubstituted or substituted amide or sulfonamide group each having up to 6 carbon atoms, wherein the substituents are selected from the group consisting of COOM, OH, $OCH_3$, $NH_2$, Cl, $COOCH_3$, $COOCH_2CH_3$, $CH_3$, $CH_2CH_2COOM$, $(CH_2)_3COOM$ and $CH_2OCH_2COOM$,
at an acid value of pH situated between 1.0 and 3.0, under formation of the intermediate dye of general formula (X),

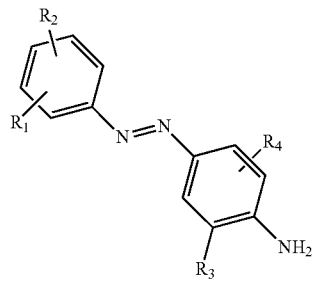
(X)

wherein the intermediate dye of general formula (X) is diazotized and subsequently coupled with K-Acid at an acid value of pH situated between 0.5 and 2.0 under formation of the intermediate dye of general formula (XII),

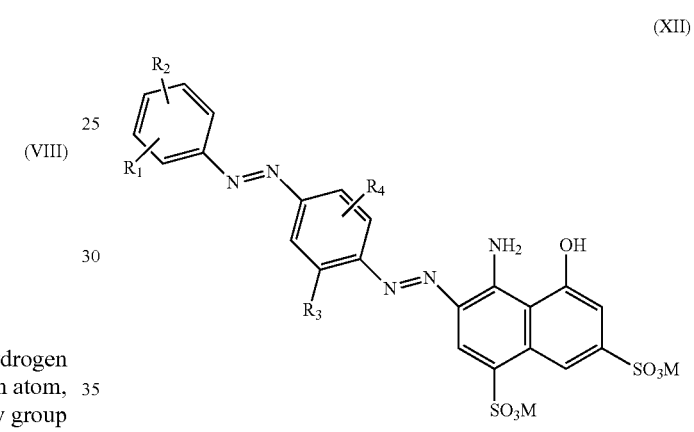
(XII)

wherein
M is the cation of the base used during the coupling reaction to maintain the pH value at the defined pH range,
wherein the intermediate dye of general formula (XII) is subsequently coupled with a diazonium compound of general formula (XIII)

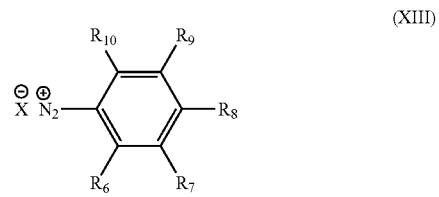
(XIII)

where $R_6$, $R_7$, $R_8$, $R_9$ and $R_{10}$ independently represent a hydrogen atom, a $SO_3M$ group, a $NO_2$ group, a nitrile group, an amino group, a COOM group, a halogen atom, an ester group, an alkyl or alkoxy group each having from 1 to 2 carbon atoms, an unsubstituted or substituted amide or sulfonamide group or sulfone group each having up to 6 carbon atoms, wherein the substituents are selected from the group consisting of COOM, Cl, OH, $OCH_3$, $COOCH_3$, $COOCH_2CH_3$, $CH_3$, $CH_2CH_2COOM$, $(CH_2)_3COOM$ and $CH_2OCH_2COOM$ and X is the anion of the acid used during the diazotization, or of general formula (XIV)

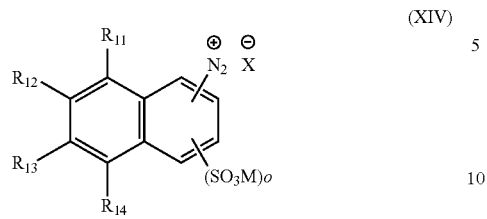

where o is 0 or 1, $R_{11}$, $R_{12}$, $R_{13}$ and $R_{14}$ independently represent a hydrogen atom, a $SO_3M$ group, a $NO_2$ group, a COOM group, an unsubstituted or substituted amide or sulfonamide group having up to 6 carbon atom, wherein the substituents are selected from the group consisting of COOM, OH, $OCH_3$, $NH_2$, Cl, $COOCH_3$, $COOCH_2CH_3$, $CH_3$, $CH_2CH_2COOM$, $(CH_2)_3COOM$ and $CH_2OCH_2COOM$ and X is the anion of the acid used during the diazotization, at a more or less neutral value of pH situated between about 5.0 and 9.0 yielding the dye of general formula (V).

* * * * *